Nov. 7, 1961
G. A. DOBSLAW
3,007,499
UNIVERSAL SAW MOUNT FOR PORTABLE POWER SAWS ON MACHINE SUPPORTS
Filed Sept. 12, 1960
2 Sheets-Sheet 1
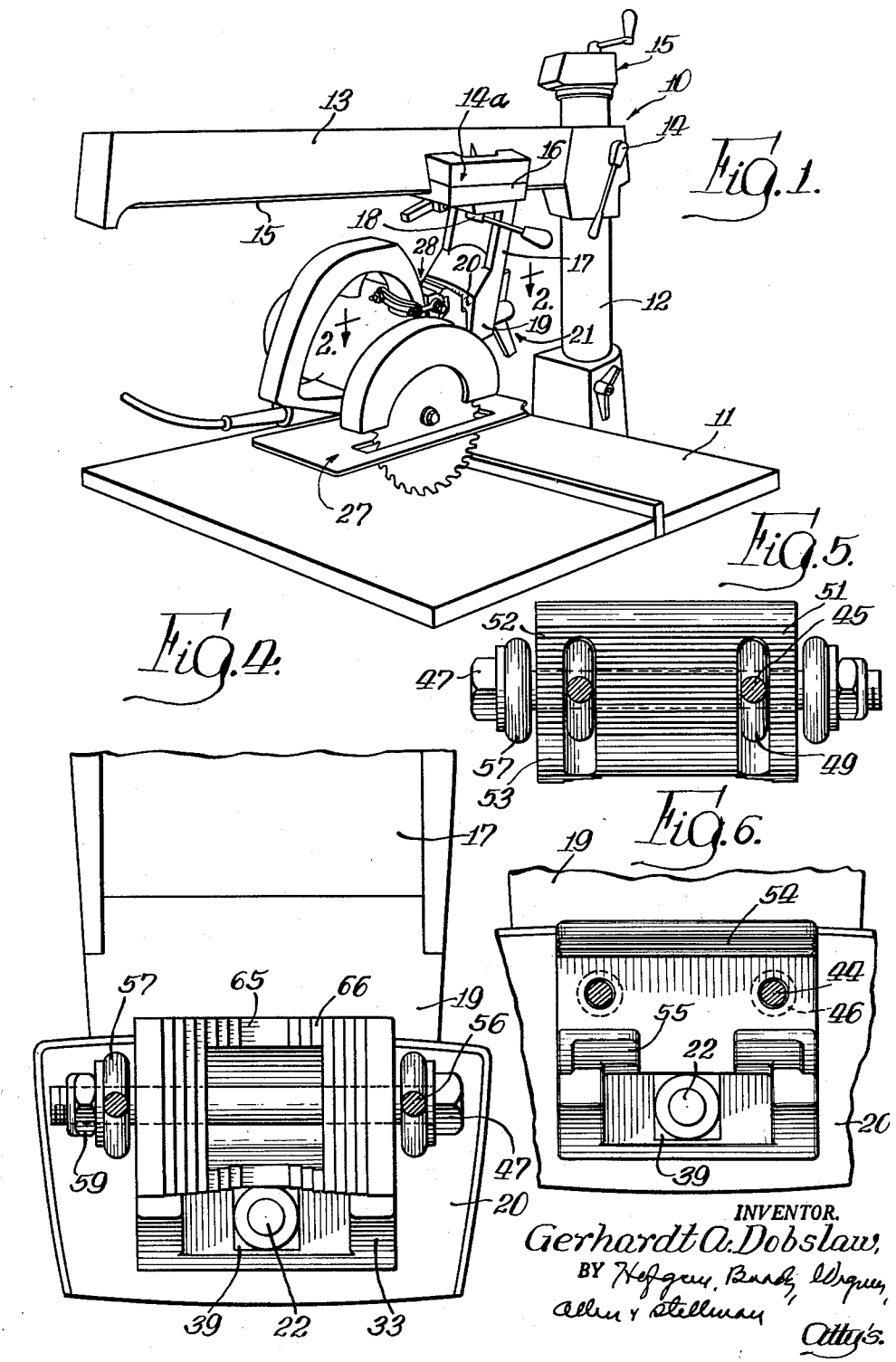
INVENTOR.
Gerhardt A. Dobslaw,

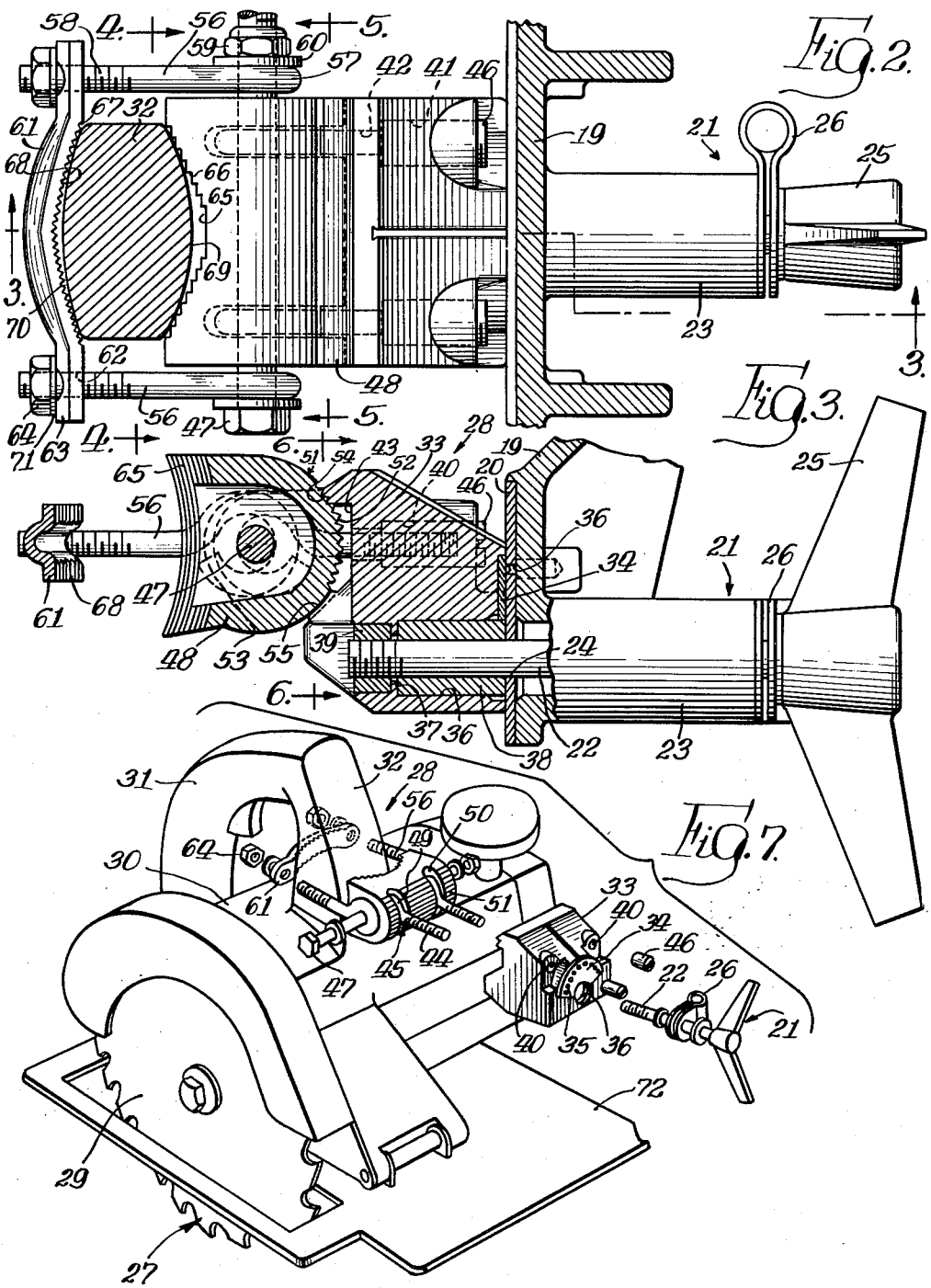

United States Patent Office 3,007,499
Patented Nov. 7, 1961

3,007,499
UNIVERSAL SAW MOUNT FOR PORTABLE POWER SAWS ON MACHINE SUPPORTS
Gerhardt A. Dobslaw, Park Forest, Ill., assignor to Portable Electric Tools, Inc., a corporation of Illinois
Filed Sept. 12, 1960, Ser. No. 55,248
7 Claims. (Cl. 143—6)

This invention relates to powered saws and particularly to radial arm saws.

An improved form of powered saw comprises a radial saw wherein the rotatable saw blade is movably mounted on an arm cantilevered from an upright post associated with a suitable table for carrying the work. Such saws have been found to provide an improved facilitated cutting, such as ripping, cross-cutting, mitering, beveling, etc., as the cutting of the work is done through the upper surface thereof which is readily viewable by the operator.

Another form of well-known powered saw which is in universal use comprises a portable, or hand, power saw wherein the saw blade is carried by a housing enclosing an electric motor and provided with a suitable handle for manipulating the saw independently of the table or the like. The specific configurations of the handles provided by the different manufacturers of such portable saws differ somewhat although substantially all are generally similar in the provision of some form of upright handle portion extending from an upper portion of the housing.

The present invention is concerned with apparatus for mounting such portable hand saws on the arm of such a radial saw arm permitting the portable saw to be used selectively as the saw means of the radial arm saw or in the conventional, independent, portable saw manner. Thus, it is a principal object of the present invention to provide a new and improved apparatus for mounting on a radial saw arm support any one of a plurality of powered hand saws each having a handle including an upright portion which may differ in the respective saws.

Another object of the invention is to provide such an apparatus arranged for facilitated association of the hand saw with the radial saw arm while providing positive accurate alignment of the hand saw with the saw arm.

A further object of the invention is the provision of such apparatus including a first clamp member, means fixing the first clamp member relative to a saw arm support selectively in any one of a plurality of angular positions about a first axis parallel to the longitudinal extent of the saw arm and about a second axis accurately transverse to the first axis, a second clamp member, and means securing the second clamp member in spaced relationship to the first clamp member selectively in any one of a plurality of angular positions about the second axis independently of the angular position of the first clamp member about the second axis, the means securing the second clamp member further including means for adjusting the spacing thereof from the first clamp member for clamping the handle portion of a powered hand saw therebetween.

A yet further object of the invention is to provide such apparatus having new and improved means for positive locking of the saw handle portion in association with the clamp members to arrange the hand saw in accurate alignment with the radial saw arm.

Other features and advantages of the invention will be apparent from the following description, taken in connection with the accompanying drawing wherein:

FIGURE 1 is a perspective view of a radial arm saw means having a portable hand saw mounted thereon by means of mounting apparatus embodying the invention;

FIGURE 2 is a fragmentary, enlarged horizontal section taken substantially along the line 2—2 of FIGURE 1;

FIGURE 3 is a fragmentary vertical section taken substantially along the line 3—3 of FIGURE 2;

FIGURE 4 (Sheet 1) is a fragmentary vertical transverse section taken substantially along the line 4—4 of FIGURE 2;

FIGURE 5 is a fragmentary vertical transverse section taken substantially along the line 5—5 of FIGURE 2;

FIGURE 6 is a fragmentary vertical transverse section taken substantially along the line 6—6 of FIGURE 3; and FIGURE 7 is an exploded view of the mounting apparatus in association with one form of hand saw.

In the exemplary embodiment of the invention as disclosed in the drawing, a radial arm saw structure, generally designated 10, includes a table 11, a post structure 12 upstanding from the rear portion of the table 11, and a radial arm 13 cantilevered from the post structure 12 to overlie the table 11. The radial arm 13 is adjusted positionally on post structure 12 by suitable manually operable means 14 and 15.

Depending from arm 13 is a conventional support 14a which is slidable longitudinally of the arm 13 on a track 15 carried on the underside of the arm. Conventionally, the support 14 includes a carriage portion 16 from which depends a swivel arm 17 adjustably secured to the carriage by means of a clamp 18. The lower portion 19 of the swivel arm is provided with a conventional dial plate 20 and a handle clamp assembly generally designated 21 for use in securing a conventional adaptor (not shown) to the swivel arm portion 19. As best seen in FIGURES 2, 3 and 7, the handle clamp assembly 21 includes a threaded rod 22 extending through a tubular portion 23 of the swivel arm lower end 19 and an opening 24 in dial plate 20. A manipulating handle 25 is secured to the rear end of the rod 24 and suitable thrust elements 26 are disposed between the handle 25 and the tubular swivel arm portion 23.

As best seen in FIGURES 1 and 7, a conventional powered rotary hand saw generally designated 27 is secured to the swivel arm portion 19 by a mounting apparatus generally designated 28 embodying the invention. Hand saw 27 may comprise any one of a plurality of powered hand saws provided by different manufacturers, which hand saws may respectively have manipulating handles of slightly differing configuration. In illustrating the invention, one such hand saw is shown, it being understood that mounting apparatus 28 is adapted for use with such differing hand saws. More specifically, the hand saw 27 comprises a rotary saw blade 29 driven by a suitable electric motor (not shown) within a housing 30. A handle 31 for manipulating the hand saw is secured to the housing and includes an upright portion 32. Mounting apparatus 28 is arranged for association with the upright portion 32 as illustrated, and with generally similar upright portions of generally similar hand saws which may differ somewhat from the illustrated upright portion in such characteristics as cross sectional configuration, angularity of extension from the housing, and the like. Thus, mounting apparatus 28 comprises essentially a universal mounting means permitting the use of any one of a large number of different manufacturers' hand saws with the radial saw structure 10.

More specifically, mounting apparatus 28 herein comprises an adaptor block 33 having a rear dial-engaging portion 34 including a plurality of projections 35 selectively engageable in corresponding recesses 36 of dial 20. The lower portion of the adaptor block defines a bore 36 having a radially inwardly projecting flange 37 to the rear of which is disposed a bushing 38 and to the front of which is disposed a nut 39 threaded on the rod 22 whereby the adaptor block is fixably secured to the swivel arm portion 19 as a result of a suitable manipulation of handle 25 to thread rod 22 through nut 39.

The upper portion of support block 33 is provided with a pair of countersunk bores 40 including an outer enlarged portion 41 and an inner, smaller diameter portion 42 opening forwardly through a front face 43 of the support block. The bores 40 extend axially parallel to the bore 36 to receive the threaded shank portions 44 of a pair of eyebolts 45, a pair of tubular nuts 46 fitted in bore portions 41 being threadable on the shank portions 44.

A hex-head bolt 47 extending through a first clamp member 48 passes through the eyes 49 of the eyebolts 45, which eyes are freely received in a pair of corresponding slots 50 in the rear surface 51 of the first clamp member 48. As best seen in FIGURES 3 and 5, the rear surface 51 is generally cylindrical and includes an upper portion 52 defined by a plurality of laterally extending teeth, and a lower arcuate portion 53. The front surface 43 of the suport block 33 includes an upper toothed portion 54 complementary to the portion 52 of the first clamp member, and a lower segmentally cylindrical portion 55 complementary to the arcuate portion 53 of the first clamp member. Thusly, by manipulating nuts 46 to draw the eyebolt shanks 44 rearwardly through the bore 40, the first clamp member 48 is urged forcibly rearwardly to engage the toothed portion 52 thereof with the toothed portion 54 of the support block, and the arcuate portion 53 thereof with the corresponding portion 55 of the support block. Referring to FIGURE 3, the first clamp member 48 may be positioned in any one of a plurality of angular positions relative to the axis of bolt 47 in being so secured to the support block 33, the clamp member being supported by the clamp block surface portion 55 and locked against rotation from the selected position by the engagement of the toothed surface portion 54 with its portion 52.

Referring now more specifically to FIGURE 2, a second pair of eyebolts 56 are arranged with their eye portions 57 rotatably mounted on the bolt 47 outboard of the first clamp member 48 whereby the shank portion 58 thereof may extend pivotally in a generally forward direction from the first clamp member. A suitable nut 59 and washer 60 may be provided on the projecting end of the bolt 47 to maintain the assembly. A second clamp member 61 is carried by the laterally spaced threaded portions 58 of the eyebolts 56, the eyebolt portions 58 extending freely through a pair of openings 62 in the opposite ends 63 of the second clamp member. A pair of nuts 64 are threaded on the threaded portions 58 of the eyebolts 56 to bear against the second clamp member ends 63 and adjustably space the second clamp member from the first clamp member. The front surface 65 of the first clamp member 48 is generally segmentally cylindrical about a vertical axis and is provided with a plurality of vertically extending teeth 66. The rear surface 67 of the second clamp member 61 is generally complementary to surface 65 being generally segmentally cylindrical about a vertical axis and being provided with a plurality of teeth 68. Thus, when the saw handle portion 32 is received between surfaces 65 and 67, and the second clamp member 61 drawn toward the first clamp member by suitable adjustment of nuts 64, the teeth 66 and 68 positively lock the handle portion 32 therebetween, effectively precluding rotation of the handle about the vertical axis, and assuring alignment of the saw blade 29 with the longitudinal extent of the radial saw arm 13. Further, as the angular position of the first clamp member on the bolt 47 may be adjusted selectively so that the rear surface 65 faces horizontally as shown in the drawing, at an angle downwardly from the horizontal position, or at an angle upwardly from the horizontal position, by loosening the tubular nuts 46 and positioning the first clamp member as desired, the front surface 65 may be arranged to accommodate different handle portions 32 having different angular extensions of the rear handle surface 69. Further, as the eyebolts 56 are pivotally mounted on the bolt 47 independently of the angular position of the first clamp member, the second clamp member 61 may be arranged to accommodate a substantial range of angularities of the front surface 70 of the handle portion 32 which may differ from the angularity of the rear surface 69 of the handle portion as provided in different power saws.

The mounting of the saw 27 on the radial arm support 14 is readily effected by removing the second clamp member 61 from the eyebolts 56. Saw handle surface 69 is then juxtaposed to the front surface 65 of the first clamp member and the eyebolts 56 are swung to extend forwardly on either side of the handle portion 32. The second clamp member 61 is then installed on the eyebolts by inserting the eyebolt threaded portions 58 through the openings 62 therein and the nuts 64, with suitable washers 71 installed between the nuts and the second clamp member ends 63, threaded on the eyebolt portions 58 to draw the second clamp member 61 toward the first clamp member. As the second clamp member surface 67 is drawn into forcible engagement with the saw handle surface 70, the pivotal mounting of the eyebolts 56 on the bolt 47 permits the second clamp member to adjust itself properly to firmly engage the handle surface 70 at the angle thereof.

The first clamp member is 48 then positioned in association with the support block 33 to assure a horizontal extension of the shoe 72 of the saw by arranging the plate 34 of the support block to extend perpendicular to the shoe 72.

The mounting apparatus 28, having thusly been secured to the saw 27, is then installed on the swivel arm portion 19 by juxtaposing plate 34 to dial plate 36 and securing the elements in association by threading the rod 22 into nut 39 carried by the support block. The saw may be so installed with the blade 29 thereof extending in a vertical plane or inclined as desired to the vertical plane by suitably engaging the dial projections 35 with the dial plate recesses 36, thereby providing a corresponding tilt of the mounting apparatus and saw as for bevel cutting of the work.

The power saw is readily removed from association with the radial saw arm by a reverse of the above indicated mounting procedure. If desired, the mounting apparatus may be retained on the saw handle portion 32 when the saw is removed, permitting the saw to be readily subsequently reinstalled.

While I have shown and described one embodiment of my invention, it is to be understood that it is capable of many modifications. Changes, therefore, in the construction and arrangement may be made without departing from the spirit and scope of the invention as defined in the appended claims.

I claim:

1. Apparatus for mounting on a support carried by a radial saw arm any one of a plurality of powered hand saws each having an upright handle portion which may differ in the respective saws, comprising: a block; means for removably securing the block to the arm support selectively in any one of a plurality of angular positions about a first axis parallel to the longitudinal extent of the radial saw arm; a first clamp member; means securing the first clamp member to the block selectively in any one of a plurality of angular positions about a second axis transverse to said first axis; a second clamp member; and means associating the second clamp member in spaced relationship with the first clamp member selectively in any one of a plurality of angular positions about said second axis independently of the angular position of the first clamp member about said second axis, said last named means further including means for adjusting the spacing of the second clamp member from the first clamp member for clamping the handle portion of a powered hand saw therebetween.

2. Apparatus for mounting on a support carried by a radial saw arm any one of a plurality of powered hand saws each having an upright handle portion which may differ in the respective saws, comprising: a block; means for removably securing the block to the arm support selectively in any one of a plurality of angular positions about a first axis parallel to the longitudinal extent of the radial saw arm; a pivot member defining a second axis transverse to said first axis; a first clamp member pivotably mounted on the pivot member; means securing the pivot member to the block and engaging the first clamp member with the block selectively in any one of a plurality of angular positions about said second axis; a second clamp member; and means associating the second clamp member in spaced relationship with the first clamp member selectively in any one of a plurality of angular positions about said second axis independently of the angular position of the first clamp member about said second axis, said last named means further including means for adjusting the spacing of the second clamp member from the first clamp member for clamping the handle portion of a powered hand saw therebetween.

3. The apparatus of claim 2 wherein said block includes a concave portion including a segmentally cylindrical bearing surface and a toothed surface, and said first clamp member includes complementary segmentally cylindrical and toothed surfaces concentric of said second axis for bearing on and locking with said block bearing and toothed surfaces respectively.

4. Apparatus for mounting on a support carried by a radial saw arm any one of a plurality of powered hand saws each having an upright handle portion which may differ in the respective saws, comprising: a first clamp member; means fixing the first clamp member relative to the saw arm support selectively in any one of a plurality of angular positions about a first axis parallel to the longitudinal extent of the saw arm and about a second axis accurately transverse to said first axis; a second clamp member; and means associating the second clamp member in spaced relationship with the first clamp member selectively in any one of a plurality of angular positions about said second axis independently of the angular position of the first clamp member about said second axis, said last named means further including means for adjusting the spacing of the second clamp member from the first clamp member for clamping the handle portion of a powered hand saw therebetween.

5. The apparatus of claim 4 wherein the means associating the second clamp member with the first clamp member includes elements spaced parallel to said second axis and extending perpendicularly thereto, and the adjusting means includes means co-operating with said elements for applying pressure to laterally opposite ends of the second clamp member to urge the second clamp member toward the first clamp member and partially around the handle portion.

6. The apparatus of claim 4 wherein the clamp members are provided with confronting handle-engaging portions extending a substantial distance parallel to said second axis for positively locking the handle portion therebetween against rotation about a third axis transverse to said second axis.

7. Apparatus for mounting on a support carried by a radial saw arm any one of a plurality of powered hand saws each having an upright handle portion which may differ in the respective saws, comprising: an adaptor block including a generally cylindrical concave front surface; a first clamp member having a bore therethrough, a generally cylindrical convex rear surface extending longitudinally parallel to said bore, and a generally cylindrical concave front surface; a bolt extending through the first clamp member bore; a pair of eyebolts having eyes pivotally carried on the bolt and shanks secured longitudinally adjustably to the adaptor block to urge the first clamp member rear surface into locked engagement with the front surface of the adaptor block; a second clamp member having a generally cylindrical concave rear surface generally complementary to the front surface of the first clamp member, and end portions each provided with an opening; a second pair of eyebolts having eyes pivotally carried on the opposite ends of the bolt and shanks extending through the second clamp member openings; and nuts secured to the free ends of the shanks of the second pair of eyebolts for urging the second clamp member toward the first clamp member selectively in any one of a plurality of angular positions about the axis of the bolt.

References Cited in the file of this patent

UNITED STATES PATENTS

| | | |
|---|---|---|
| 409,852 | Merrill | Aug. 27, 1889 |
| 1,867,275 | McCarter | July 12, 1932 |
| 2,522,789 | Johnson | Sept. 19, 1950 |
| 2,694,585 | Fiori | Nov. 16, 1954 |
| 2,835,285 | Gardner | May 20, 1958 |